(12) United States Patent
Beck et al.

(10) Patent No.: US 7,554,571 B1
(45) Date of Patent: Jun. 30, 2009

(54) DYNAMIC LAYOUT OF PARTICIPANTS IN A MULTI-PARTY VIDEO CONFERENCE

(75) Inventors: Alexander John Gray Beck, Freches Forest (AU); Jonathan R. Yee-Hang Choy, Wahroonga (AU); Alexander Martin Scholte, Phegans Bay (AU); David Preshan Thambiratnam, Ashfield (AU)

(73) Assignee: Avaya Inc., Basking Ridge, NJ (US)

( * ) Notice: Subject to any disclaimer, the term of this patent is extended or adjusted under 35 U.S.C. 154(b) by 923 days.

(21) Appl. No.: 11/083,459

(22) Filed: Mar. 18, 2005

(51) Int. Cl.
*H04N 7/15* (2006.01)

(52) U.S. Cl. ............... 348/14.07; 348/14.08; 348/14.09

(58) Field of Classification Search .............. 348/14.07, 348/14.08, 14.09
See application file for complete search history.

(56) References Cited

U.S. PATENT DOCUMENTS

| | | | |
|---|---|---|---|
| 5,430,473 | A | 7/1995 | Beecher, II et al. |
| 5,619,254 | A | 4/1997 | McNelley |
| 6,046,767 | A | 4/2000 | Smith |
| 6,878,924 | B2 | 4/2005 | Baron |
| 2005/0128221 | A1* | 6/2005 | Aratani et al. ............... 345/619 |
| 2005/0157164 | A1* | 7/2005 | Eshkoli et al. ............ 348/14.07 |

FOREIGN PATENT DOCUMENTS

| | | |
|---|---|---|
| EP | 0118182 | 9/1989 |
| JP | 401221086 A | 9/1989 |
| JP | 404344788 A | 12/1992 |

OTHER PUBLICATIONS

U.S. Appl. No. 10/459,182, filed Jun. 10, 2003, Chan, et al.
U.S. Appl. No. 10/949,781, filed Sep. 24, 2004, Lang.
Wolberg, George, "Digital Image Warping," IEEE Computer Society Press Monograph (Mar. 4, 2002), available at http://www-cs.ccny.cuny.edu/~wolberg/diw.html, 7 pages.
Oshima, Shigeru, "Acquisition: Fundamental Optics of Television Camera Lenses," shortened version of the Fundamental Optics section in *Canon Guidebook of Television System Optics* ($2^{nd}$ Ed. ), (Jan. 2000), 13 pages.

(Continued)

*Primary Examiner*—Stella L Woo
(74) *Attorney, Agent, or Firm*—Sheridan Ross P.C.

(57) ABSTRACT

The present invention provides a video conference system that is capable of adjusting image window sizes based on the number of video conference participants included in an image window. In particular, face recognition technology is applied to determine the number of persons included within an image associated with a video call. The information regarding the number of participants in the video call is used as a factor in determining the area of a video output device in which the image from the video call is presented at another video endpoint. The sizing of individual image windows may also be determined based on the total number of participants in a video conference.

21 Claims, 4 Drawing Sheets

OTHER PUBLICATIONS

Marpe et al., "Video Compression Using Context-Based Adaptive Arithmetric Coding," Proc. IEEE International Conference on Image Processing (ICIP'01), vol. III, pp. 558-561, Oct. 2001.

Mark et al., "Post-Rendering 3D Warping", In Proceedings of 1997 Symposium on Interactive 3D Graphics, Providence, RI, Apr. 27-30, 1997, pp. 7-16.

Toshiba Corporation Press Release, "Toshiba Announces World's First Image Recognition LSI for Intelligent Vehicle System," (Feb. 6, 2001), available at http://www.toshiba.co.jp/about/press/2001_02/pr0602.htm, 3 pages.

Peter Kauff Projects, "BS-Immersive Media & 3D Video Group," (Ed. Christoph Fehn, Nov. 12, 2002), 6 pages.

Imagis Technologies Inc. News Release, "Imagis Technologies Releases Major Upgrade to Face Recognition Software," (Sep. 2002).

Eisert, Peter, "Immersive 3-D Video Conferencing: Challenges, Concepts, and Implementations," Proc. SPIE Visual Communications and Image Processing (VCIP), Lagano, Switzerland (Jul. 2003), 11 pages.

* cited by examiner

DYNAMIC LAYOUT OF PARTICIPANTS IN A MULTI-PARTY VIDEO CONFERENCE

FIELD OF THE INVENTION

The invention relates to a video conference system in which the area of a display devoted to a call included in a multiple call video conference is determined with reference to the number of persons imaged as part of the video call.

BACKGROUND OF THE INVENTION

The use of video conferencing or telephony, which allows remote parties to both see and hear one another, is becoming increasingly popular. As used herein, "video telephony" refers to communications using both video and audio transmitted over a communications network. Such applications facilitate remote communications by providing a visual image of each conference participant. Accordingly, video conferencing allows parties to communicate audibly and visibly, without requiring lengthy and expensive travel.

In a typical video telephony application, a camera is positioned to obtain an image of the participants at each endpoint of the communication. The image of the participants at one endpoint is then provided to the participants at the other endpoints. Accordingly, the video telecommunications interaction can include two or more endpoints, and one or more participants at each endpoint.

The image obtained from an endpoint is displayed to participants at other endpoints. For an endpoint in communication with two or more other endpoints, the images from the other endpoints can be merged by a multipoint control unit associated with the video conference, such that the images are displayed simultaneously. Such simultaneous display may comprise tiling the images from other endpoints. Typically, tiling comprising giving each incoming call an equally sized box in which the image is displayed. However, an image from an endpoint included in a video conference may contain more than one person. As a result, the window allocated to such a call may be too small to effectively display all of the people included in the image.

SUMMARY OF THE INVENTION

The present invention is directed to solving these and other problems and disadvantages of the prior art. In accordance with embodiments of the present invention, the size of the window used to display an image from an endpoint participating in a multipoint video conference is determined with reference to the number of persons included in the image. In particular, a call from an endpoint providing an image with a number of included persons is generally given a larger area in which to display the image than a call associated with an image including a smaller number of persons or a single person.

In accordance with other embodiments of the present invention, the size of a window in which an image from a video conference endpoint is displayed is additionally determined with reference to the total number of persons included in a video conference. In accordance with still other embodiments of the present invention, the area or size of a window allocated to displaying an image associated with a call within a video conference is additionally determined with reference to the total available display area. A weighting factor may also be applied with respect to one or more video conference endpoint images, for example to give prominence to a speaker or participants at a particular location.

Additional features and advantages of the present invention will become more readily apparent from the following discussion, particularly when taken together with the accompanying drawings.

DETAILED DESCRIPTION

Figure 1:
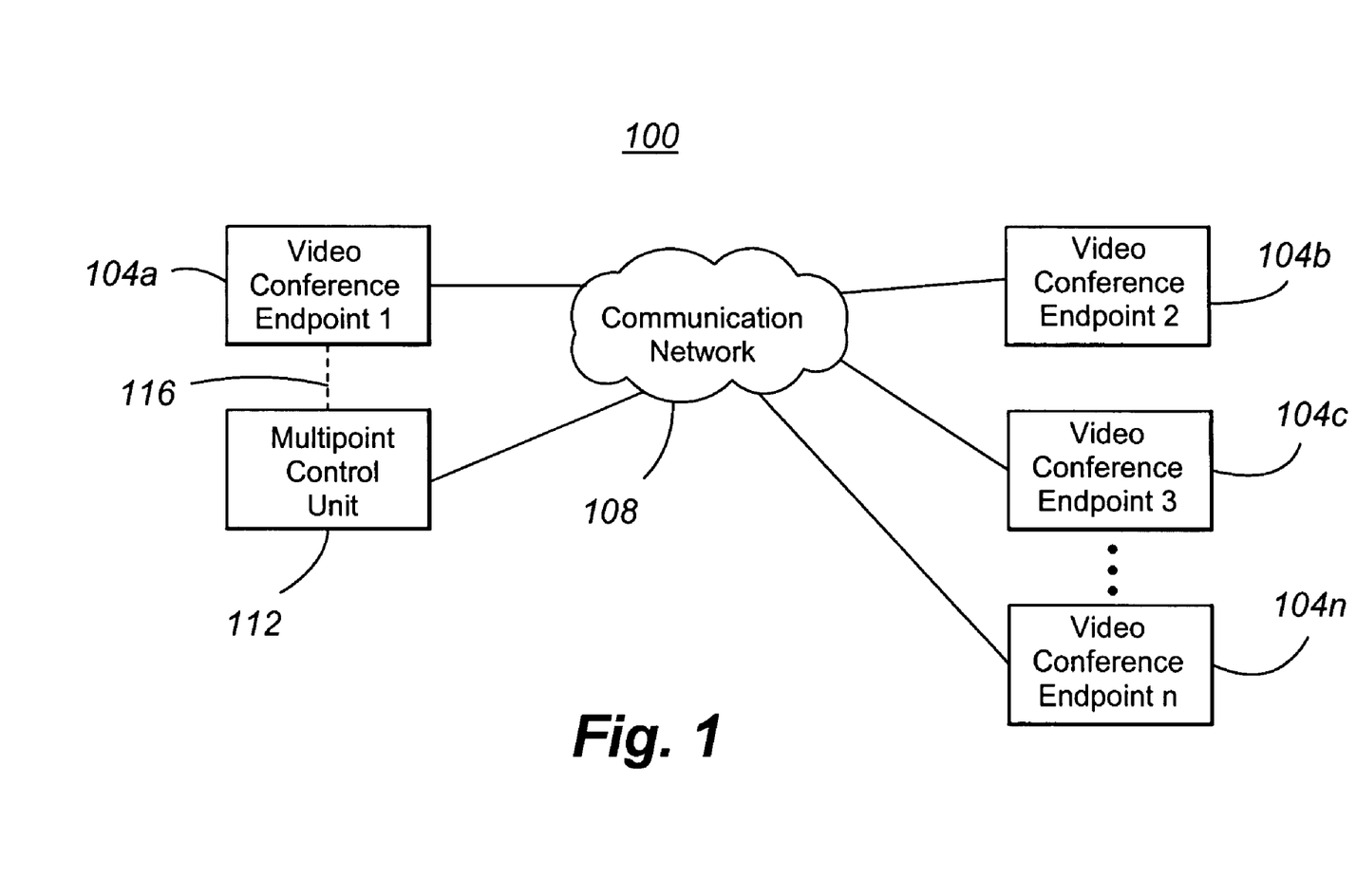
FIG. 1 is a block diagram of a video conferencing system in accordance with embodiments of the present invention.

With reference now to FIG. 1, components generally included in a video conferencing system 100 in accordance with embodiments of the present invention are depicted. In general, the system 100 may include a number of video conference endpoints 104. For example, the system 100 may include a first video conference endpoint 104a, a second video conference endpoint 104b, a third video conference endpoint 104c, and an nth video conference endpoint 104n. However, a lesser or greater number of video conference endpoints 104 than is shown in the example illustration may be included. In general, as will be described in greater detail elsewhere herein, each video conference endpoint 104 generally supports video and audio communications with one or more other video conference endpoints. Furthermore, each video conference endpoint 104 may be associated with one or more persons or video conference participants. Each video conference endpoint 104 may further be associated with a different location.

The video conference endpoints 104 are generally capable of communicating with one another across a communication network 108. The communication network 108 may comprise a packet data network, such as a local area network (LAN) and/or a wide area network (WAN). Alternatively or in addition, the communication network 108 may comprise a dedicated connection between two or more video conference endpoints 104 and/or a multipoint control unit 112. In accordance with still other embodiments of the present invention, the communication network 108 may comprise a circuit based communication network, such as the public switched telephony network (PSTN). Furthermore, the communication network 108 may include a number of different network types in various configurations.

The video conferencing system 100 also generally includes a multipoint control unit 112. In general, the multipoint control unit 112 functions to coordinate individual calls from different video conference endpoints 104 into an integrated, multiple endpoint video conference. The multiple point control unit 112 may be in communication with some or all of the video conference endpoints 104 included in a video conference call through the communication network 108. The multipoint control unit 112 may also be associated with one or more video conference endpoints 104 through a direct connection 116. Furthermore, such direct connection may comprise integration of a video conference endpoint, such as the first video conference endpoint 104a, and the multipoint control unit 112.

Figure 2:
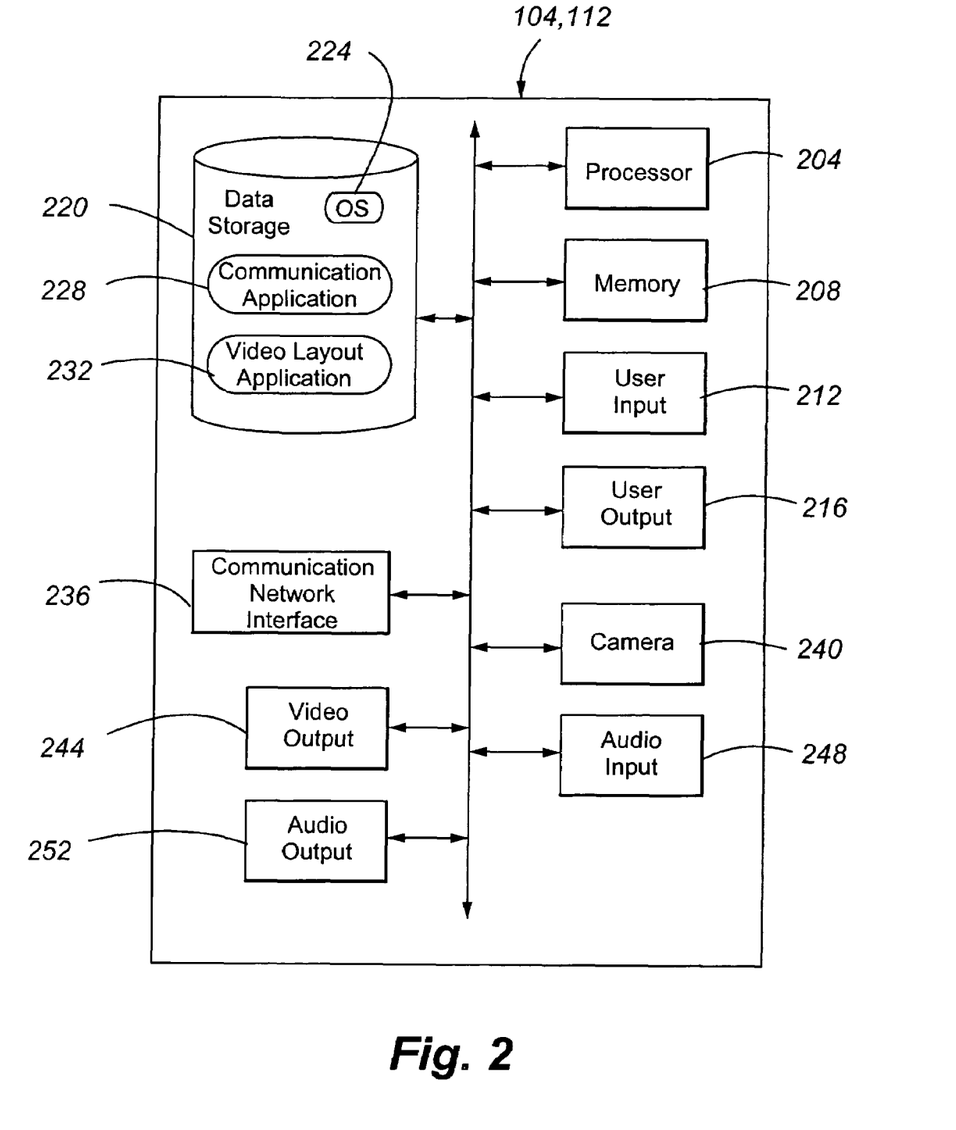
FIG. 2 is a block diagram depicting components of a video conference endpoint and/or a multipoint control unit in accordance with embodiments of the present invention.

With reference now to FIG. 2, components that may be provided as part of or in association with a video endpoint 104 are illustrated. In addition, components that may be included as part of a standalone multipoint control unit 112, or of an integrated video conference endpoint 104 and multipoint control unit 112, are illustrated. The components may include a processor 204 capable of executing program instructions. Accordingly, the processor 204 may include any general purpose programmable processor or controller for executing application programming. Alternatively, the processor 204 may comprise a specially configured application specific integrated circuit (ASIC). The processor 204 generally functions to run programming code implementing various of the functions performed by the communication endpoint 104 and/or multipoint control unit 112, including video layout functions as described herein.

A video conference endpoint 104 and/or multipoint control unit 112 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of input devices 212 include a keyboard, numeric keypad, and pointing device combined with a screen or other position encoder. Examples of user output devices 216 include an alphanumeric display, ringer, printer port or indicator lights.

A video conference endpoint 104 or multipoint control unit 112 may also include data storage 220 for the storage of application programming and/or data. For example, operating system software 224 may be stored in the data storage 220. Examples of applications that may be stored in the data storage 220 include communication application software 228. As can be appreciated by one of skill in the art, a communication application 228 may comprise instructions for implementing a soft video telephone, for example where the video conference endpoint 104 (or integrated video conference endpoint 104 and multipoint control unit 112) comprises a general purpose computer. Another example of an application that may be stored in the data storage 220 includes video layout application software 232. In particular, a multipoint control unit 112, or a video conference endpoint 104 integrated with or implementing the functions of a multipoint control unit 112, may include video layout application software 232 for performing video display layout functions as described herein. Accordingly, a single multipoint control unit 112 or integrated video conference endpoint 104 and multipoint control unit 112 can control the video output of each video conference endpoint 104 included in a video conference. Alternatively, or in addition, a video conference endpoint 104 may include video layout application software, for example for controlling the output of a display (video output 244) associated with that video conference endpoint. The data storage 220 may comprise a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

A video conference endpoint 104 and/or a multipoint control unit 112 may also include one or more communication network interfaces 236. For example, a video communication endpoint 104 or a multipoint control unit 112 may include a communication network interface 236 comprising a network interface card (NIC), a modem, a telephony port, a serial or parallel or data port, or other wire line or wireless communication network interface.

In addition, a video conference endpoint 104, or an integrated video conference endpoint 104 and multipoint control unit 112, generally includes one or more imaging cameras 240. The camera 240 functions to obtain an image of persons using the video conference endpoint 104 to participate in a video communication session, including a video conference. Accordingly, the camera 240 may comprise a digital camera having optical elements, such as a lens system with selectable zoom and/or focus capabilities, and electronic elements, such as a charge coupled device (CCD) for converting image information collected by the optical elements into digital image data.

An exemplary video conference endpoint 104 or a multipoint control unit 112 also generally includes a video output or display device 244. The video output 244 may be used to display image information from one or more remote video conference endpoints 104. In addition, control and status information may be presented through the video output 244. Examples of a video output 244 include a cathode ray tube (CRT), liquid crystal display (LCD), plasma display or other device capable of reproducing transmitted video images.

In connection with the support of audio communications, a video conference endpoint 104 or integrated video conference endpoint 104 and multipoint control unit 112, may include an audio input 248 and an audio output 252. The audio input 248 may comprise a microphone for receiving audio information from persons at the location of the video conference endpoint 104. The audio output device 252 may include one or more speakers or headphones.

As can be appreciated by one of skill in the art from the description provided herein, the particular components that are included as part of a video conference endpoint 104 or a multipoint control unit 112 will generally be determined by those components and functions necessary to support the included features of the video conference endpoint 104 or multipoint control unit 112. Accordingly, a particular video conference endpoint 104 or multipoint control unit 112 may not include each of the components and applications illustrated in FIG. 2. Furthermore, included components and applications can be implemented as or dispersed among physically or logically separate components.

As can be appreciated by one of skill in the art from the description provided herein, a video conference endpoint 104 or a multipoint control unit 112 may comprise a general purpose computer and associated peripheral devices. In accordance with other embodiments of the present invention, a video conference endpoint 104 may comprise an integrated video conference unit, for example implemented as a dedicated hardware device, rather than as or part of a general purpose computer. Furthermore, it can be appreciated that the functions of a multipoint control unit 112 may be incorporated into or integrated with a video conference endpoint 104. In addition, a multipoint control unit 112 is not required to be co-located with any one video conference endpoint 104, but rather may be remote with respect to all of the video conference endpoints 104 associated with a particular multiple endpoint video conference.

Figure 3:
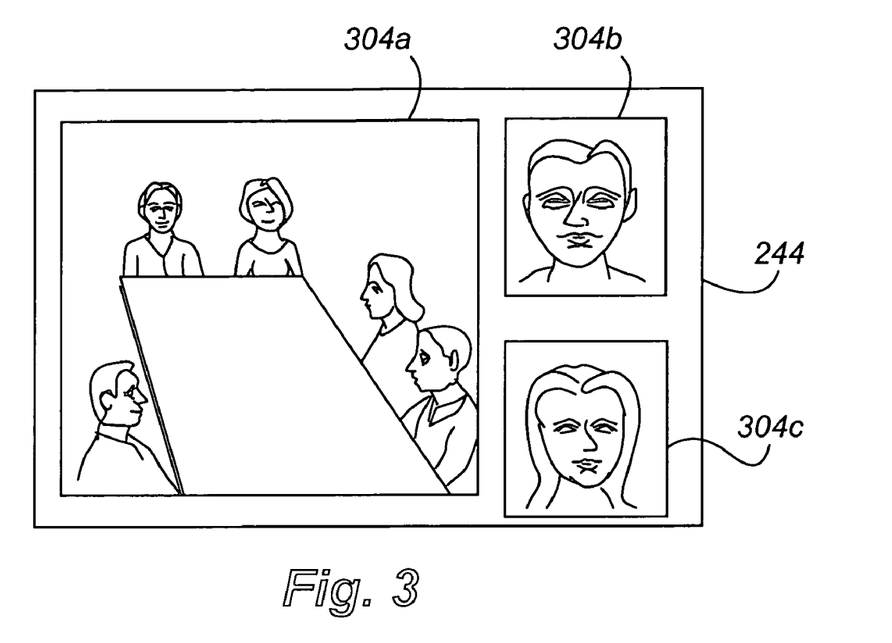
FIG. 3 is an example of a display output in accordance with embodiments of the present invention.

With reference now to FIG. 3, an example of the output of a video output device 244 associated with a video conference endpoint 104 or an integrated video conference endpoint 104 and multipoint control unit 112, is illustrated. In the example of FIG. 3, the illustrated display output is representative of a four endpoint video conference. That is, three image windows 304a, 304b and 304c, each of which represents an image provided from a different video conference endpoint 104, are included in the output of the video output device 244. Accordingly, if the video output device 244 of FIG. 3 is associated with a first video conference endpoint 104a, the first window 304a may comprise image information provided by a second video conference endpoint 104b, the second image window 304b may comprise image information provided from a third video conference endpoint 104c, and the third image window 304c may comprise image information provided from a fourth video conference endpoint 104n.

The first image window 304a shown in FIG. 3 includes images of five persons. In contrast, the second 304b and third 304c image windows each contain images of a single person. Because the first image window 304a includes images of a greater number of participants than the second and third image windows 304b and 304c, the area of the video output device 244 allocated to displaying the image information from the second video conference endpoint 104b is larger than the areas of the second 304b and third 304c image windows. Furthermore, because the second 304b and third 304c image windows each contain images of the same number of persons, the areas of the second 304b and third 304c image windows is the same.

Figure 4:
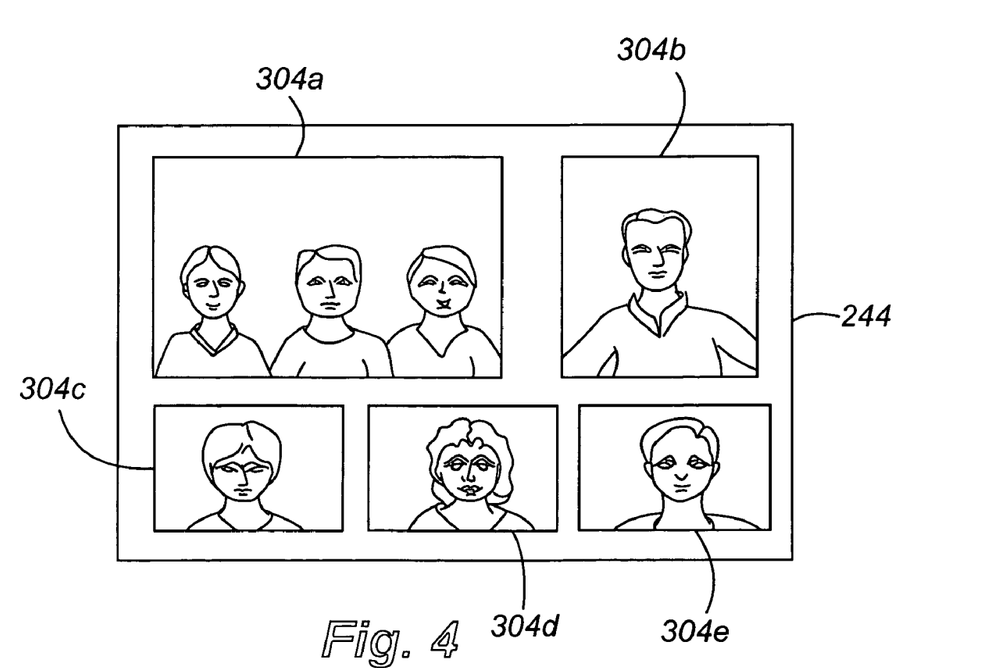
FIG. 4 is another example of a display output in accordance with embodiments of the present invention.

With reference now to FIG. 4, another example of the output of a video output device 244 in accordance with embodiments of the present invention is illustrated. In the example of FIG. 4, five image windows 304a-e are included. In general, the image in each of the windows 304a-e may be from a different video conference endpoint 104. The first window 304a includes images of three persons, while the remaining image windows 304b-e each contain an image of one person. Accordingly, the area of the video output device 244 allocated to the first image window 304a is greater than the remaining image windows 304b-e. The area of the second image window 304b is greater than the area of each of the third 304c, fourth 304d, and fifth 304e image windows, even though each of the second through fifth image windows 304b through 304e contains the image of only one person. The differential allocation of the display area with respect to image feeds containing the same number of persons is an example of the effect of differentially weighting image feeds or calls associated with a video conference. For example, the call associated with the second image window 304b may be weighted so that the size of the associated image window 304b is larger than other image windows having a like number of participants. Such differential weighting can be used to ensure that the presenter or chair of a video conference is given a larger or more prominent image display window 304. In addition, it should be appreciated that the video feeds associated with display windows 304 may include a video feed from a camera 240 associated with a local video conference endpoint 104. That is, an image of the video conference participants at a location may be displayed at that location, so that the participants can see how they appear to participants at other video conference endpoints 104 participating in a video conference call.

Figure 5:
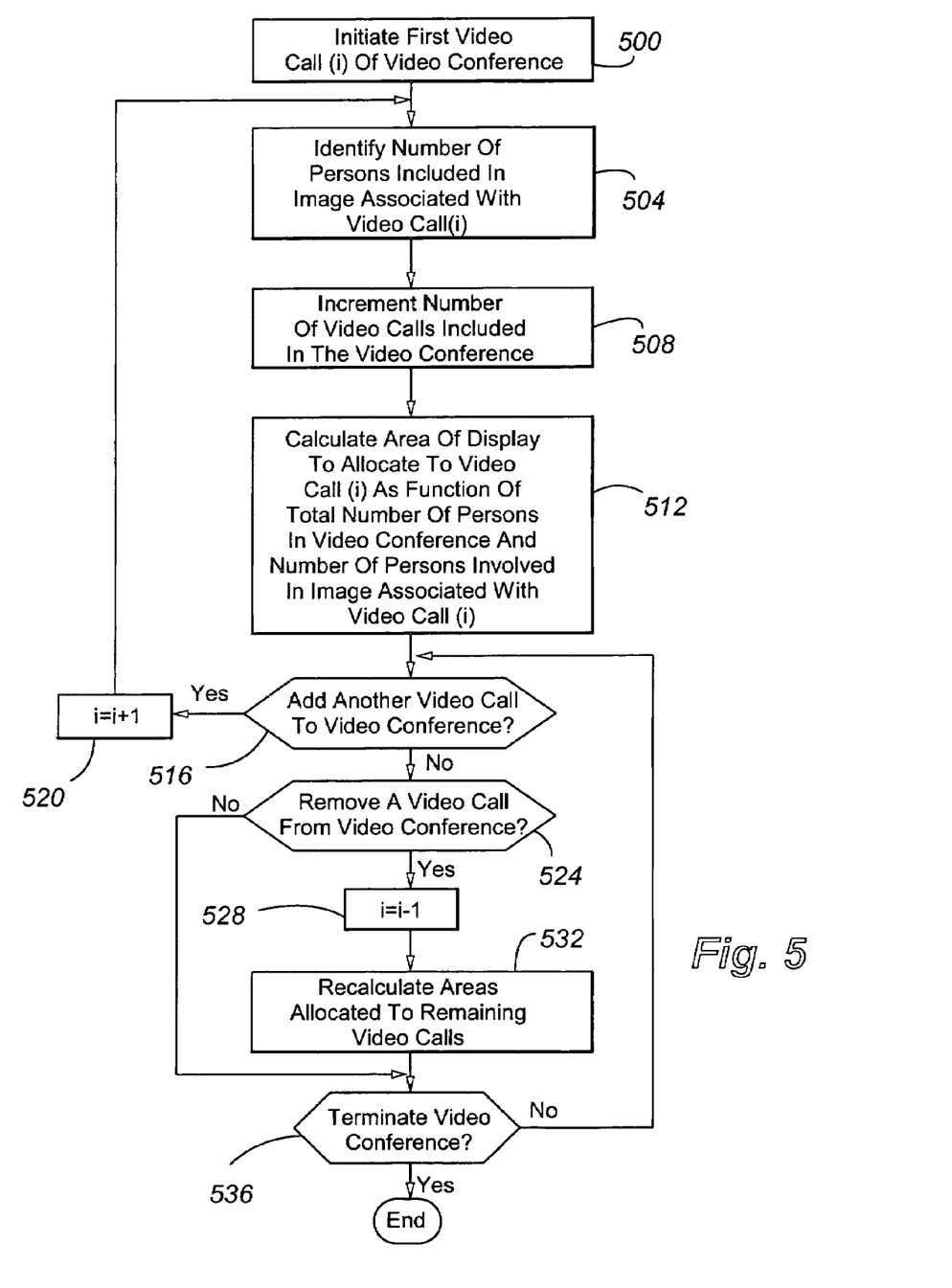
FIG. 5 is a flowchart depicting aspects of the operation of a video conferencing system in accordance with embodiments of the present invention.

With reference now to FIG. 5, aspects of the operation of a system 100 in accordance with embodiments of the present invention are illustrated. At step 500, a first video conference call (i=1) of a video conference is initiated. Initiation of a first video conference call may comprise establishing contact with an assigned or selected multipoint control unit 112 from a first video conference endpoint 104a. In accordance with other embodiments of the present invention, initiating a first video call of a video conference may comprise configuring a multipoint control unit 112 interconnected to or integrated with a first video conference endpoint 104a to receive calls from other video conference endpoints 104.

At step 504, the number of persons included in an image associated with a video call (i) may be identified. The identification of the number of persons included within an image feed associated with a video call may be achieved by performing face detection with respect to the image feed. For example, human face detection algorithms or programs used to control the pointing of a camera can be applied to identify the number of human faces included within an image, and therefore determine the number of persons included in the image feed. In accordance with embodiments of the present invention, such face detection algorithms are incorporated into or integrated with video layout application software 232 running in or implemented by a video conference endpoint 104, a multipoint control unit 112, or by an integrated video conference endpoint 104 and multipoint control unit 112.

The number of video calls included in the video conference may then be incremented (step 508). The area of the display or video output device 244 allocated for displaying image information associated with the video call (i) under consideration is then calculated. In particular, the calculation of the area of the image window for the video call (i) is calculated as a function of or with reference to the total number of persons from all of the calls for which image information is to be displayed, and the number of persons included in the video call (i) under consideration (step 512). Furthermore, the area allocated can be determined with reference to the total area available by a video display device 244 and the total number of display windows 304 that need to be accommodated. In accordance with embodiments of the present invention, the calculation of the area of the image window for a video call (i) is performed by operation of a video layout application software 232 running in or implemented by a video conference endpoint 104, a multipoint control unit 112, or by an integrated video conference endpoint 104 and multipoint control unit 112. For example, the calculation of the area of the image window for a video call (i) may be performed by each video endpoint 104 that will display the image associated with the video call (i), by one video endpoint 104 for use by that endpoint 104 and/or other video endpoints 104, or by a multipoint control unit 112.

At step 516, a determination is made as to whether another video call is to be added to the video conference. If another call is to be added, the index (i) is incremented by one (i=i+1) (step 520) and the process returns to step 504. If another video call is not to be added to the video conference, a determination may next be made as to whether a video call is to be removed from the video conference (step 524). If the video call is to be removed, the index (i) is decremented by one (i=i−1) (step 528) and the areas allocated to the remaining video calls may be recalculated (step 532). The recalculation of the areas of windows 304 may be performed using the same considerations and/or algorithms as used at step 512. After recalculating the window areas 304 at step 532, or after a determination at step 524 that a video call is not to be removed from the video conference, a determination may be made as to whether the video conference has been terminated (step 536). If the video conference has not been terminated, the process may return to step 516. If the video conference has been terminated, the process may end.

In accordance with embodiments of the present invention that determine the window area 304 for a particular video feed with reference to the number of participants in the image, the surface area of a video output or display device 244, and the total number of video conference participants in all of the calls, an example algorithm is as follows:

$$s_i = \frac{n_i}{N} S$$

where $s_i$ is the surface area allocated to call (i), S is the total available display area, $n_i$ is the number of participants detected in call (i), and N is the total number of video conference participants that are displayed by the display 244 of a video conference endpoint 104 at which the video feed for call i will be presented. In connection with embodiments that allow for a selected weight to be applied to a call, an example algorithm for determining the area of a window 304 for a call is as follows:

$$s_i = a_i \frac{n_i}{N} S,$$

where $a_i$ is the weight to be applied to call i. Of course, other algorithms capable of adjusting the area of a display used to present a video feed based on the number of persons included in that video feed can be created and are within the scope of the present description.

In accordance with embodiments of the present invention, the video camera 240 used to obtain an image associated with a call can provide focal length or magnification information to a video conference endpoint 104 or a multipoint control unit 112. This size information can be used in calculating the size of the window 304 used to display the image information collected by the camera 240. The information from the camera 240 can also be used to modify the weight $a_i$ associated with the call.

From the description provided herein, it can be appreciated that embodiments of the present invention are capable of adjusting the size of an area used to present an image from a video conference endpoint according to the number of persons included in that image. In addition, embodiments of the present invention are capable of adjusting window sizes dynamically, depending on the total number of calls participating in a video conference, and the total number of participants in that conference. For example, embodiments of the present invention may permit the resizing of windows 304 as the number of participants within one or more of the windows 304 presented by a video output device 244 changes.

Embodiments of the present invention may determine the number of participants in an image associated with a video call (i.e. in a video feed from a video endpoint 104) at various times. For example, the number of persons in a video feed may be determined for each frame of video information. Alternatively, the number of participants in a video feed may be determined periodically. In addition, the present invention may calculate the size of a window 304 used to present a video feed for each frame of video information associated with a displayed video feed, periodically, or each time a change in the number of faces detected in a video feed changes.

As can be appreciated by one of skill in the art from the description provided herein, where a determination of the size of an area used to present image information is performed by operation of video layout application software 232 that is remote from the receiving video endpoint 104 at which the image information (or an instance of the image information) is to be displayed, the determination must be included in the image information or otherwise communicated to the receiving video endpoint 104. Accordingly, the size determination can be included in the image information by appropriately formatting that information before delivering it to the receiving video endpoint 104. Alternatively, instructions related to the determined size of the area used to present the image information may be provided to the receiving video endpoint. These instructions may state the image size in absolute terms (e.g., may specify the actual size of the area or the number of pixels comprising the area), relative to the size of the display, or relative to the size of one or more other areas of the display that are or will be used to represent other image streams.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for dynamically determining a layout of a video output, comprising:
   obtaining a first image from a first location;
   determining a number of faces included within said first image;
   obtaining a second image from a second location;
   determining a number of faces included within said second image;
   determining a size of a first area within at least a first display device in which said first image from said first location is to be reproduced, wherein said size of said area is determined with reference to at least said number of faces included within said first image, wherein said first image includes a first determined number of faces, and wherein a first area size is selected for said first image;
   determining a size of a second area within said at least a first display device in which said second image from said second location is to be reproduced, wherein said size of said second area is determined with reference to at least said number of faces included within said second image, wherein said second image includes a second determined number of faces, wherein a second area size is selected for said second image, and wherein said first determined number of faces is greater than said second determined number of faces; and
   displaying said first image and said second image on said first display device, wherein said first area size in which said first image is included is larger than said second area size in which said second image is included.

2. The method of claim 1, further comprising:
   determining a total number of faces to be reproduced by said first display device, wherein said size of said second area is reproduced by said at least one display device is determined with additional reference to said determined total number of faces to be reproduced by said first display device.

3. The method of claim 1, further comprising:
   determining a total number of images to be reproduced by said first display device, wherein said size of said first area and a size of said second area are determined with reference to said determined total number of images to be reproduced by said first display device.

4. The method of claim 3, wherein said total number of images corresponds to a total number of locations from which an image is to be reproduced by first display device.

5. The method of claim 1, wherein said first image comprises a series of images.

6. The method of claim 5, wherein said series of images is associated with a frame rate, wherein said determining a number of faces included in said first image is performed for each frame of said series of images.

7. The method of claim 5, wherein said determining a number of faces included in said first image is performed periodically.

8. The method of claim 1, further comprising:
displaying at least said first image at said second location and displaying at least said second image at said first location.

9. The method of claim 1, further comprising:
obtaining a third image from a third location;
determining a number of faces included within said third image;
determining a size of a third area within at least one of said first display device, a second display device, and a third display device in which said third image from said third location is to be displayed, wherein said size of said third area is determined with reference to said determined total number of faces to be reproduced by said at least one display device;
displaying said first image from said first location at said second and third locations, wherein said determining a size of an area within a display device in which said first image is to be displayed is for at least said second location additionally determined with reference to at least one of a total number of images to be displayed at said second location and a determined total number of faces to be displayed at said second location;
displaying said second image from said second location at said first and third locations; and
displaying said third image from said third location at said first and second locations.

10. The method of claim 1, wherein said first and second locations comprise first and second video conference locations respectively, and wherein said first image and said second image are displayed in at least said first display device associated with a third video conference location.

11. The method of claim 10, wherein said first image is obtained as part of a video conference arrangement, wherein said size of said first area $s_i$ is determined by the expression $$s_i = \frac{n_i}{N}S,$$

where is the total available display area, $n_i$ is the number of participants detected in call (i), N is the total number of video conference participants that are displayed by said first display, and i is equal to one to correspond to said first image.

12. The method of claim 10, wherein said size of said first area $s_i$ is determined by the expression $$s_i = a_i \frac{n_i}{N}S,$$

where $a_i$ is the weight to be applied to call i, S is the total available display area, $n_i$ is the number of participants detected in call (i), N is the total number of video conference participants that are displayed by said first display, and i is equal to one to correspond to said first image.

13. The method of claim 1, wherein said size of said area within said first display device is adjusted by applying a weighting factor.

14. A video communication system, comprising:
a multipoint control unit;
a first video conference endpoint, including:
 a display;
a second video conference endpoint, including:
 a camera;
a third video conference endpoint, including:
 a camera;
a communication network interconnecting at least said multipoint control unit to said first video conference endpoint, to said second video conference endpoint, and to said third video conference endpoint, wherein a size of a first area of said display of said first video conference endpoint containing an image from said second video conference endpoint is determined with reference to a number of faces included in said image from said second video conference endpoint and a size of a second area of said display of said first video conference endpoint, containing an image from said third video conference endpoint is determined with reference to a number of faces, included in said image from said third video conference endpoint, wherein said image from said second video conference endpoint is determined to contain a first number of faces, wherein said image from said third video conference endpoint is determined to contain a second number of said faces, wherein said first number of faces is greater than said second number of faces, and wherein said size of said first area of said display of said first video conference endpoint containing an image from said second video conference endpoint is greater than a size of said second area of said display of said first video conference endpoint containing an image from said third video conference endpoint.

15. The system of claim 14, wherein said size of said first area of said display of said first video conference endpoint containing said image from said second video conference endpoint and said size of said second area of said display of said first video conference endpoint containing said image from said third video conference endpoint are determined with reference to a total number of faces included in said image from said second video conference endpoint and said image from said third video conference endpoint.

16. The system of claim 14, wherein said determination of a size of said first area and a size of said second area is made in connection with instructions running on said multipoint control unit.

17. The system of claim 16, wherein said multipoint control unit is integrated with said first video conference endpoint.

18. The system of claim 14, wherein said first video conference endpoint further includes a camera, and wherein each of said second and third video conference endpoints further include a display, wherein an image from said first and third video conference endpoints is displayed by said display included in said second video conference endpoint, and wherein an image from said first and second video conference endpoints is displayed by said display included in said third video conference endpoint.

19. A video conference system, comprising:
   means for transferring video communication data;
   at a first video conference location, first video conference endpoint means, including:
      means for collecting image information from said first video conference location;
      means for displaying received image information to persons at said first video conference location;
      means for interfacing said first video conference endpoint means to said means for transferring video communication data, wherein video communication data obtained by said means for collecting image information is delivered to said means for transferring video communication data, and wherein video communication data for display by said means for displaying is received from said means for transferring video communication data;
   at a second video conference location, second video conference endpoint means, including:
      means for collecting image information from said second video conference location;
      means for displaying received image information to persons at said second video conference location;
      means for interfacing said second video conference endpoint means to said means for transferring video communication data, wherein video communication data obtained by said means for collecting image information is delivered to said means for transferring video communication data, and wherein video communication data for display by said means for displaying is received from said means for transferring video communication data;
   at a third video conference location, third video conference endpoint means, including:
      means for displaying received image information to persons at said third video conference location;
      means for interfacing said third video conference endpoint means to said means for transferring video communication data, wherein video communication data for display by said means for displaying is received from said means for transferring video communication data;
   means for formatting video images in communication with said first video endpoint means, including:
      means for determining a number of faces included in image information collected by said means for collecting image information of at least said first video conference endpoint means and said second video conference endpoint means; and
   means for allocating a first area of a means for displaying received image information collected by at least said first video conference endpoint means and a second area of said means for displaying received image information collected by at least said second video conference endpoint means, wherein said first area and said second area is determined based at least in part on said determined number of faces included in said collected image information.

20. The system of claim 19, wherein said means for formatting video images is integrated with said first video conference endpoint means.

21. The system of claim 19, wherein said means for formatting video images further includes means for interfacing to said means for transferring video communication data, wherein said image information is received from said means for transferring video communication data, and wherein information related to an allocated area is provided to at least said second video conference endpoint means.

* * * * *